Figure 2:
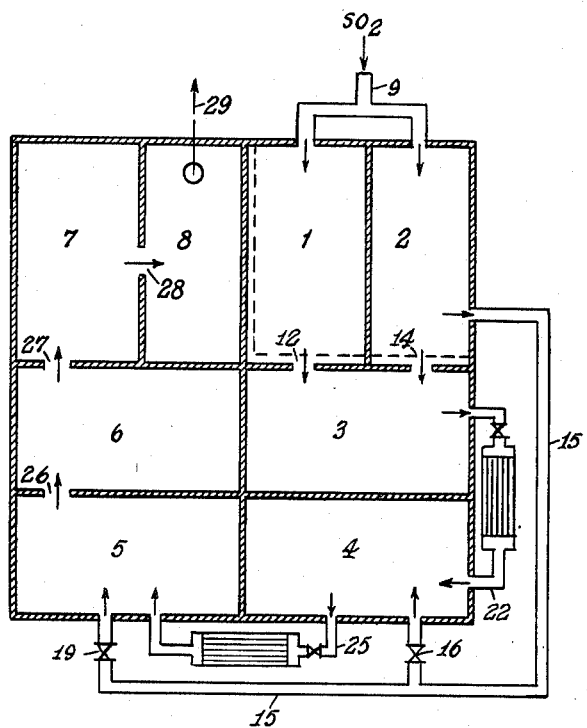

May 18, 1954     P. KACHKAROFF ET AL     2,678,872
PROCESS AND APPARATUS FOR SULFURIC ACID PRODUCTION
Filed Feb. 19, 1948     2 Sheets-Sheet 1

Fig. 1.

INVENTORS
PIERRE KACHKAROFF, DECEASED, GIUSEPPINA BUSSETTI NEE MARAGLIANO
AND LUCIA PETTENATI, SOLE HEIRS, AND PIETRO GUARESCHI
BY
    ATTORNEY

Patented May 18, 1954

2,678,872

UNITED STATES PATENT OFFICE 2,678,872

PROCESS AND APPARATUS FOR SULFURIC ACID PRODUCTION

Pierre Kachkaroff, deceased, late of Genoa, Italy, by Giuseppina Busseti (née Maragliano) and Lucia Pettenati, heirs, and Pietro Guareschi, Genoa, Italy Application February 19, 1948, Serial No. 9,566
In Italy November 26, 1946

Section 1, Public Law 690, August 8, 1946
Patent expires November 26, 1966

7 Claims. (Cl. 23—168)

The present invention relates to a method for the production of sulphuric acid from sulphur dioxide, oxygen and water by means of highly concentrated sulphuric acid which contains nitrogen oxides, free or combined, so-called nitrous sulphuric acid.

It is known to produce sulphuric acid from sulphur dioxide, oxygen (air) and water by means of nitrogen oxides, which transfer the oxygen to sulphur dioxide to form sulphur trioxide. Such a method is known under the name of the lead chamber method. A characteristic point for this method is that the gases leaving the reaction chamber contain practically the whole quantity of nitrogen oxides, which have brought about the oxidation process.

It is thus necessary to recover these nitrogen oxides through absorption in sulphuric acid of suitable concentration in recovering towers, so-called Gay-Lussac towers. The nitrous sulphuric acid produced in these towers is conveyed back to the beginning of the system, where it is denitrated in denitrating towers, so-called Glover towers, by means of the entering hot gases containing sulphur dioxide.

The improvement of the old lead chamber method, known as the tower system, could not alter the characteristic point mentioned above. A considerably increased production of sulphuric acid, it is true, was made possible by the "tower system" by circulating a certain amount of nitrous sulphuric acid in the reaction tower in order to get better conditions of equilibrium. But it was impossible to avoid the fact that still a considerable volume was necessary for the main reaction, i. e. the production of sulphuric acid, as well as for the absorption of the nitrous gases leaving the reaction tower.

A further drawback of the lead chamber method is the fact that, on the one hand, the reaction velocity depends on the time which is necessary for the re-oxidation of (half of) the nitric monoxide (NO), formed during the process (to nitric dioxide, NO$_2$), and, on the other hand, that this oxidation is very slow. Therefore the whole reaction velocity in the chamber system and, consequently, the reaction volume depend on this re-oxidation.

These drawbacks of the method used hitherto for the production of the sulphuric acid according to the lead chamber method are avoided by the highly intensive and effective method for production of sulphuric acid which is the subject of this invention. By this invention it is possible to considerably reduce the reaction volume necessary for the production of the sulphuric acid and to a great extent to avoid the absorption of nitrogen oxides at the end of the system.

It has been discovered that by adequately controlling the temperature in the reaction chamber and by using a suitable quantity of sulphuric acid, the concentration of which and content of nitrogen oxides of which are high enough, a very rapid and complete reaction completely in the liquid phase can be obtained so that the tail gases do not contain noticeable quantities of sulphur dioxide or nitrogen oxides. In this way, the necessary volume for the formation of the sulphuric acid is considerably reduced as compared with other methods, and the extensive apparatus (Gay-Lussacs) for the recovery of the nitrous gases can be eliminated or their volume reduced to the value corresponding to the working losses.

It appears that such a possibility of reaction exclusively in liquid phase, without evolution of nitrous gases, with the exception of the very small amounts evolving due to the vapor tension of the liquid, is due to the formation of highly oxidized nitro-sulphuric compounds, probably compounds containing 2 persulphuric groups ($-SO_4)_2$, while the nitrogen oxides, on the other hand, during their reduction by $SO_2$ pass from nitric to nitrous oxide ($N_2O_5$ to $N_2O_3$) which are both soluble in sulphuric acid and do never form gaseous NO which is practically insoluble in $H_2SO_4$ and has a very low oxidation velocity. Thus the nitrogen assumes never a valance below 3.

According to the invention the nitrous persulphuric acid circulating in the reaction chambers shall have a content of more than 75% $H_2SO_4$, preferably 78 to 80% $H_2SO_4$. The invention is, in the first hand, characterized in the fact that per unit of volume of the reaction chamber the molecular ratio between $SO_2$ as such and the nitrogen oxides, calculated as $N_2O_3$, is 1:2.5 or less, e. g. preferably about 1:3 to 1:5. The content of nitrous oxides in this acid, calculated as $N_2O_3$, amounts at least to 3-4%, and preferably between 5 and 6%, per cent meaning in this case, as usual, in the sulphuric acid manufacture, grams per 100 cubic centimeters. The molecular proportion between the sulphur dioxide entering the reaction chamber and the nitrogen oxides present at the same time as nitrous sulphuric acid or in gaseous form, calculated as $N_2O_3$, should preferably not be more than 1:2.5 or be less.

The temperature should be controlled in such a way that the nitrous sulphuric acid in the reaction towers will not be warmer than 60° C. for instance max. 55° C. The temperature is preferably controlled by means of suitable cooling arrangements for the circulating nitrous persulphuric acid. Owing to the composition of this acid it is possible to use pipes of ordinary iron, cast iron or lead.

Specially suitable working conditions are obtained by dividing the reaction chamber into a plurality of compartments which are all fed with circulating nitrous persulphuric acid of the same composition. Such division may, for instance, be effected by using separate towers, or by using one (single) reaction tower with a plurality of vertical sections.

A characteristic point of the method according to this invention is this that the nitrous persulphuric acid to be denitrated in the denitrating towers, that is the acid produced in the reaction chambers, is diluted before being denitrated, which dilution may take place in the denitration tower itself. In this way the denitration is considerably facilitated and can be performed even by sulphur dioxide containing gases having a low temperature. The nitrous gases formed during the denitration are conveyed to the reaction chamber together with the sulphur dioxide containing gases.

Owing to the possibility of denitrating the acid with relatively cold gases the heat of these gases can be used for concentrating the sulphuric acid produced. For this purpose the denitrated acid may be passed through a concentrating tower in countercurrent to the warm gases containing sulphur dioxide which are to be used later in the denitrating tower. In this way it is possible to obtain a considerable part of the sulphuric acid produced in a concentration of 66° Bé., i. e. 95% $H_2SO_4$ and more.

The concentration tower may preferably be designed in the same manner as the denitration tower and if it is not desired to carry on the denitration to completeness in the latter tower, the concentration tower may be used for the residual denitration of the sulphuric acid and is then run also as a denitration tower. In this case both the towers work in series with regard to the acid as well as to the gas.

According to the invention it may, however, be preferable from various points of view to run the denitrating-towers in parallel, at least with regard to the gas.

It is thus possible to pass all acid to be denitrated to one of the towers and there denitrate only to such an extent as is deemed necessary for the acid to be used in the recovering towers. After withdrawing the amount necessary for these towers the rest is passed to the other denitrating tower in order to be completely denitrated, maybe after some dilution.

According to another embodiment one denitrating tower is used substantially only for acid circulating between this tower and the recovering towers, while the acid emanating from the reaction towers is denitrated in another denitrating tower and, if desired, then concentrated in a further tower.

It is evidently possible before the reaction tower to have more than two denitrating towers.

The gas issuing from the denitrating towers is passed, at least partly, to the first one of a number of reaction towers which are usually passed in series by the gas. The gas is preferably cooled when passing from one tower to the other so that the temperature can be controlled in these towers. A portion of the Glover-gas, for instance from one of the denitrating towers, preferably from that one supplying the $SO_2$-richest gas, may be passed by the first reaction tower so as to be introduced into one or more of the subsequent towers, preferably, however, not into the last one. Thereby, the first tower will not be overloaded and the production will become more evenly distributed over the various towers but for the last one, which, however, warrants a practically complete absorption of $SO_2$.

It is consequently possible according to the invention to run the reaction towers more or less in parallel. Thereby it is, on the other hand, possible by adequate control of the passage of the gases in series and in parallel to maintain suitable concentrations of $SO_2$, that is to control the partial pressure of $SO_2$ and thus its solution velocity, whereby the production in the towers can be regulated and the production of the plant can be increased.

While in older sulphuric acid plants working according to the lead chamber method (tower-system), the maximum production amounted to about 30 kg. $H_2SO_4$ per m.$^3$ per day, the present invention allows to produce more than 100 kg. $H_2SO_4$ per m.$^3$ per day. Without using a concentration tower the whole production of sulphuric acid is obtained in the form of sulphuric acid of at least 60° Bé.=78% $H_2SO_4$. By using a concentration tower, 40 to 50% may be obtained at a concentration of 66° Bé.=95% $H_2SO_4$ and more.

The invention will now be described with reference to an embodiment shown in the attached drawing, but it is to be understood that it is not limited to such embodiment.

The drawing illustrates diagrammatically a plant having two denitrating towers 1 and 2 four reaction towers 3, 4, 5 and 6 and two recovering towers 7 and 8. The towers are in general connected in series in the order mentioned, the two denitrating towers being, however, connected in parallel with regard to the gas.

From a source for $SO_2$ the gas is introduced into the system through pipe 9 and the branch pipes 10 and 11 leading to the denitrating towers 1 and 2, respectively. Both these towers are further connected with the first reaction tower 3 by conduits 12 (having the valve 13) and 14, respectively. The denitrating tower 2 is furthermore connected through conduit 15 with both the intermediate reaction towers 4 and 5 by the branch conduits 16 and 17, respectively, containing the valves 18 and 19, respectively. The first reaction tower 3 is further connected with the second reaction tower 4 by means of conduit 20 containing the valve 21 and the cooler 22. Similarly the second tower 4 is connected with the third reaction tower 5 by means of a conduit 23 containing the valve 24 and the cooler 25. Said third tower can be connected with last reaction tower 6 by pipe 26. It will thus be seen that the first three reaction towers are connected in series as well as in parallel with regard to the gas.

From the last reaction tower 6 the gas is passed through conduit 27 to the first recovering tower 7 and from there through conduits 28 to the second recovering tower 8 and is eventually vented through the chimney 29.

Through adequate control of the gas passage by means of the various valves it is possible within given limits to vary the composition of the contents of the different reaction chambers and to distribute the reaction over these ones. Since the reaction takes place under heat development it is practical in addition to the acid also to cool the gas, in particular the gas supplied to the reaction towers receiving gas directly from the denitrating towers. On the other hand it is usually not required to cool the gas entering the last reaction tower.

According to the embodiment illustrated the first denitrating tower 1 is also supplied with the water necessary for the denitration through pipe 31. This denitrating tower receives also acid to be denitrated through conduit 68 from the recovering towers and through conduits 49 and 54 from the reaction towers. The acid denitrated in this tower is discharged through conduit 32 to the container 33 from which it is pumped by pump 34 partly to the second denitrating tower 2 through conduit 35 and partly to the recovering towers 7 and 8 through conduit 36.

The denitrating tower may, if desired, in addition to the acid received from the first denitrating tower also receive acid to be denitrated from the recovering towers through the branch conduit 69 of the conduit 68. In the tower 2 a final denitration takes place and from this tower the commercial product of sulphuric acid is discharged through conduit 37.

In the reaction towers 3–6 the gases are contacted with the nitrous sulphuric acid circulating in these towers. This circulating acid is supplied to all these towers through the conduits 50, 51, 52 and 53, respectively, from a common container 47 by means of pump 48 and via conduit 49. Circulating acid and acid formed in the towers escape through the individual discharge conduits 41, 42, 43 and 44, respectively, to the head conduit 45 from where the acid is passed to container 47 by conduit 46. The major portion of the acid is circulated in the reaction towers and only a relatively small portion is passed to denitration, in tower 1. By passing the nitrous sulphuric acid and the SO$_2$-gas in parallel in at least one, for instance, the first one, of the reaction towers the tendency of gas rich in SO$_2$ to exhaust said acid and develop NO is suppressed.

The residual gas discharged from the last reaction tower 6 is supplied to the recovering towers 7 and 8 in which it is contacted with denitrated strong sulphuric acid (e. g. 60° Bé.) supplied to the towers 7 and 8 from conduit 36 (from the denitrating tower) through conduits 61 and 62 respectively. To this acid a sufficient quantity of diluted nitric acid is fed, in order to supply water and integrate the losses of nitrogen oxides. From these towers the acid used for the absorption together with the diluted nitric acid, is discharged through conduits 63 and 64, respectively, to the head conduit 65 leading to the common container 66 from where the acid is pumped by pump 67 through conduit 68 to the denitrating towers for denitration.

Should the water supplied through conduit 31 not be sufficient for the process, water may be supplied to the reaction towers, e. g. to the container 47.

In the drawing the different towers are shown as separate units. According to one embodiment it is, however, to be preferred to build together the towers to form a parallelepipedic structure of chambers connected with each other, for instance, as shown in the drawing (Figure 2). In this case the chambers 1 and 2 corresponding to the denitrating towers should be separated from the other chambers by an interspace, as shown by dash lines, the transfer of heat and stresses from the denitrating towers being thus avoided.

As regards the advantages of the elasticity of working of a plant constructed according to the principles outlined above, it will be seen that the production cycle has undergone considerable improvements.

In the above description and in the attached claims the ratio between SO$_2$ and the nitrogen oxides calculated as N$_2$O$_3$ is stated as 1:1.5 and 1:2.5. If the nitrogen oxides are calculated as nitrosylsulphuric acid said ratio is instead 1:3 and 1:5, respectively.

For the sake of simplicity, the "denitrating towers" or "denitrating compartments" or the like shall be referred to in the claims as "denitrators" and the "reaction towers, or compartments, or chambers" shall be referred to as "reactors."

We claim:

1. A process for the intensive manufacture of sulphuric acid from sulphurous gases, air and water, employing nitrogen oxides as reaction accelerators, which comprises, circulating through a series of at least three reactors an acid containing from 75 to 80% of H$_2$SO$_4$ and at least 3.5% of nitrogen oxides, calculated as N$_2$O$_3$, while maintaining the composition of said acid substantially the same in all of said reactors, introducing a portion of said acid of the same composition into a denitrator, introducing sulphurous gases and air into said denitrator, in contact with said acid, causing the gases leaving said denitrator to pass through the said reactors in series whereby to form sulphuric acid in liquid phase, leading a controlled amount of gas directly from the nitrator to at least one of said reactors other than the first and last in the series, passing the gases not absorbed by said acid into a recovery tower, withdrawing denitrated acid from said denitrator and causing it to pass through the recovery tower in contact with said gases, withdrawing acid from said recovery tower and introducing it into said denitrator in contact with the incoming sulphurous gases, air and water, the quantities of acid circulating through the denitrator and the reactors being such that the molecular ratio between the nitrogen oxides in the acid, calculated as N$_2$O$_3$, and SO$_2$ is greater than 2.5 to 1.

2. A process for the intensive manufacture of sulphuric acid from sulphurous gases, air and water, employing nitrogen oxides as reaction accelerators, which comprises, introducing the sulphurous gases into a pair of denitrators, introducing the gases emitted from said denitrators into the first of a series of at least three reactors, causing the gases emitted from said first reactor to pass into a second reactor and causing the gases to pass through each of the said reactors in series, causing the gases emitted from the last reactor to pass through a pair of recovery towers in series, leading a controlled amount of gas directly from at least one of the denitrators to at least one of said reactors other than the first and last in the series, circulating through said reactors in contact with said gases an acid containing from 75 to 80 per cent of H$_2$SO$_4$ and at least 3.5 per cent of nitrogen oxides, calculated as N$_2$O$_3$, while maintaining the composition of said acid substantially the same in all of said reactors, introducing a portion of said acid into the first denitrator in contact with the gases introduced into said denitrator, passing a portion of the acid denitrated in the first denitrator through a second denitrator, passing another portion of said denitrated acid into both recovery towers through parallel conduits, introducing dilute nitric acid into said last recovery tower, circulating the acids from said recovery towers to said first denitrator, and withdrawing completely denitrated sulphuric acid from said second denitrator.

3. A process for the intensive manufacture of sulphuric acid from sulphurous gases, air and water, employing nitrogen oxides as reaction accelerators, which comprises passing hot sulphurous gases in heat interchange with sulphuric acid to effect concentration of said acid and simultaneous cooling of said gases, introducing the cooled sulphurous gases through parallel conduits into a pair of denitrators in contact with sulphuric acid containing nitrogen oxides, circulating through a series of four reactors an acid having the same composition in each of said reactors and containing from 75% to 80% of $H_2SO_4$ and at least 3.5% of nitrogen oxides, calculated as $N_2O_3$, in such amount that the ratio between the nitrogen oxides, calculated as $N_2O_3$, and the $SO_2$ contained in said sulphurous gases is more than 2.5 to 1 in each reactor, cooling the acid to maintain the temperature below 60° C., passing the gases emitted from the first denitrator and a portion of the gases emitted from the second denitrator into the first of said reactors in contact with the acid contained therein, passing the gases emitted from said first reactor and a portion of the gases emitted from the said denitrator into a second reactor, passing the gases emitted from the second reactor and a portion of the gases emitted from the second denitrator into a third reactor, passing the gases emitted from the third reactor into a fourth reactor, passing controlled amounts of gases directly from the second denitrator to the second and third reactors, passing the gases emitted from said fourth reactor into a first recovery tower, passing the gases emitted from said first recovery tower into a second recovery tower, the gases emitted from said second recovery tower being discharged to the atmosphere, withdrawing a portion of the acid circulating through the reactors and introducing said portion into the first denitrator, feeding water into said first denitrator, passing a portion of the acid denitrated in the first denitrator through the recovery towers, introducing nitric acid into the second recovery tower, passing the acids discharged from the recovery towers into the first denitrator, passing a portion of the acid drawn from the first denitrator into a second denitrator, withdrawing the completely denitrated acid from the second denitrator and passing said acid to a concentrator to effect concentration thereof by heat interchange with the hot sulphurous gases.

4. In a tower plant for the manufacture of sulphuric acid by a process employing as a catalyst highly nitrosated sulphuric acid, herein called "nitrous vitriol," a source of sulphurous gases, a denitrator vessel, a series of intermediate production towers and at least one recovery tower, the denitrator vessel and each of said towers having at least a gas inlet and a gas outlet, means for connecting the source of sulphurous gases with the gas inlet of said denitrator vessel, means for connecting the gas outlet of said denitrator vessel to a gas inlet of the first of said production towers and means for connecting the gas outlet of each of said production towers to a gas inlet of the subsequent tower in the series and for connecting the gas outlet of the last production tower to the gas inlet of the subsequent recovery tower, a container for nitrous vitriol, means for connecting said nitrous vitriol container to all of said production towers in parallel to feed nitrous vitriol to said towers and conduit means for withdrawing nitrous vitriol from said production towers, additional conduits leading directly from the gas outlet of said denitrator vessel to the gas inlet of at least one of said production towers with the exception of the first and the last ones to connect said towers in parallel as well as in series as regards the gas flow and valves for controlling the flow of gas through said additional conduits.

5. In a tower plant for the manufacture of sulphuric acid by a process employing as a catalyst highly nitrosated sulphuric acid, herein called "nitrous vitriol," a source of sulphuric gases, a denitrator vessel, a series of intermediate production towers and at least one recovery tower, the denitrator vessel and each of said towers having at least a gas inlet and a gas outlet, means for connecting the source of sulphurous gases with the gas inlet of said denitrator vessel, means for connecting the gas outlet of said denitrator vessel to a gas inlet of the first of said production towers and means for connecting the gas outlet of each of said production towers to a gas inlet of the subsequent tower in the series and for connecting the gas outlet of the last production tower to the gas inlet of the subsequent recovery tower, a container for nitrous vitriol, means for connecting said nitrous vitriol container to all of said production towers in parallel to feed nitrous vitriol to said towers and conduit means for withdrawing nitrous vitriol from said production towers, additional conduits leading directly from the gas outlet of said denitrator vessel to the gas inlet of at least one of said production towers with the exception of the first and the last ones to connect said towers in parallel as well as in series as regards the gas flow and valves for controlling the flow of gas through said additional conduits, said denitrator vessel and at least some of said towers being defined by vertical partitions in a single enclosed chamber having a substantially rectangular cross section and being connected by conduits at least part of which extends on the outside of said chamber, means for cooling at least some of said last mentioned conduits and valve means on the outside of said chamber for controlling at least some of said last mentioned conduits.

6. In a tower plant for the manufacture of sulphuric acid by a process employing as a catalyst highly nitrosated sulphuric acid, herein called "nitrous vitriol," a source of sulphurous gases, a pair of denitrator vessels, a series of intermediate production towers and at least one recovery tower, each of said denitrator vessels and towers having at least a gas inlet and a gas outlet, means for connecting the source of sulphurous gases in parallel to a gas inlet of said denitrator vessels, means for connecting the gas outlets of said denitrator vessels to a gas inlet of the first of said production towers and means for connecting the gas outlet of each of said production towers to a gas inlet of the subsequent tower in the series and for connecting the gas outlet of the last production tower to the gas inlet of the subsequent recovery tower, a container for nitrous vitriol, means for connecting said nitrous vitriol container to all of said production towers in parallel to feed nitrous vitriol to said towers and conduit means for withdrawing nitrous vitriol from said production towers to said container, additional gas conduits leading directly from the gas outlet of at least one of said denitrator vessels to a gas inlet of at least one of said production towers but the first and the last ones to connect said towers in parallel as well as in series as regards the gas flow, valves controlling the flow of gas through said additional conduits, a receiver for acid from said production towers, conduit means connected to said receiver for supplying to the first denitrator vessel a part of the acid from a recovery tower and conduit means connecting said container to the first denitrator for supplying a part of the nitrous vitriol of the same composition as that fed to the production towers, conduit means for supplying to the second denitrator vessel all the acid withdrawn from the first denitrator vessel together with a part of the acid from a recovery tower and conduit means for discharging a part of the acid of the said second denitrator vessel as production, receiver means for said acid and conduit means for leading another part of the same acid into a recovery tower.

7. In a tower plant for the manufacture of sulphuric acid by a process employing as a catalyst highly nitrosated sulphuric acid, herein called "nitrous vitriol," a source of sulphurous gases, a pair of denitrator vessels, a series of intermediate production towers and at least one recovery tower, each of said denitrator vessels and towers having at least a gas inlet and a gas outlet, means for connecting the source of sulphurous gases in parallel to a gas inlet of said denitrator vessels, means for connecting the gas outlets of said denitrator vessels to a gas inlet of the first of said production towers and means for connecting the gas outlet of each of said production towers to a gas inlet of the subsequent tower in the series and for connecting the gas outlet of the last production tower to the gas inlet of the subsequent recovery tower, a container for nitrous vitriol, means for connecting said nitrous vitriol container to all of said production towers in parallel to feed nitrous vitriol to said towers and conduit means for withdrawing nitrous vitriol from said production towers to said container, additional gas conduits leading directly from the gas outlet of at least one of said denitrator vessels to a gas inlet of at least one of said production towers but the first and the last ones to connect said towers in parallel as well as in series as regards the gas flow, valves controlling the flow of gas through said additional conduits, a receiver for acid from said production towers, conduit means connected to said receiver for supplying to the first denitrator vessel a part of the acid from a recovery tower and conduit means connecting said container to the first denitrator for supplying a part of the nitrous vitriol of the same composition as that fed to the production towers, conduit means for supplying to the second denitrator vessel all the acid withdrawn from the first denitrator vessel together with a part of the acid from a recovery tower and means for discharging a part of the acid of the said second denitrator vessel as production, receiver means for said acid and conduit means for leading another part of the same acid into a recovery tower, said denitrator vessels and at least some of said towers being defined by vertical partitions in a single enclosed chamber having a substantially rectangular cross section and being connected by conduits at least part of which extends on the outside of said chamber, means for cooling at least some of said last mentioned conduits and valve means on the outside of said chamber for controlling at least some of said last mentioned conduits.

References Cited in the file of this patent

UNITED STATES PATENTS

| Number | Name | Date |
|---|---|---|
| 1,048,953 | Fulda | Dec. 31, 1912 |
| 1,205,723 | Fairlie | Nov. 21, 1916 |
| 1,810,253 | Petersen | June 16, 1931 |
| 1,912,832 | Fairlie | June 6, 1933 |
| 1,972,932 | Harkness | Sept. 11, 1934 |
| 2,006,031 | Rothammel | June 25, 1935 |
| 2,053,834 | Kachkaroff et al. | Sept. 8, 1936 |

FOREIGN PATENTS

| Number | Country | Date |
|---|---|---|
| 363,327 | Great Britain | June 11, 1930 |
| 374,869 | Italy | June 26, 1939 |

OTHER REFERENCES

Wyld, Mfg. of Sulfuric Acid, D. Van Nostrand, 1924, pp. 267, 268, 279.